(12) United States Patent
Hardy-Francis et al.

(10) Patent No.: US 11,258,606 B1
(45) Date of Patent: Feb. 22, 2022

(54) DEVICES, SYSTEMS, METHODS, AND COMPUTER-READABLE MEDIA FOR ZERO KNOWLEDGE PROOF AUTHENTICATION

(71) Applicant: MASTERCARD TECHNOLOGIES CANADA ULC, Vancouver (CA)

(72) Inventors: Simon Hardy-Francis, Coquitlam (CA); Cecil Lau, North Vancouver (CA); Jacky Cheung, Burnaby (CA); Andrian Sevastyanov, Burnaby (CA); Kate O'Loughlin, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 16/997,317

(22) Filed: Aug. 19, 2020

(51) Int. Cl.
*H04L 9/32* (2006.01)
*H04L 9/06* (2006.01)

(52) U.S. Cl.
CPC .......... *H04L 9/3218* (2013.01); *H04L 9/0643* (2013.01); *H04L 9/3226* (2013.01); *H04L 9/3297* (2013.01)

(58) Field of Classification Search
CPC ... H04L 9/3218; H04L 9/0643; H04L 9/3226; H04L 9/3297
USPC ................. 713/168, 171, 182, 184
See application file for complete search history.

(56) References Cited

U.S. PATENT DOCUMENTS

2004/0030932 A1\* 2/2004 Juels ................... H04W 12/126
713/151
2009/0287926 A1\* 11/2009 Furukawa ............. H04L 9/3221
713/168
2014/0074719 A1 3/2014 Gressel et al.

OTHER PUBLICATIONS

GlobalSign Blog, "SSL vs TLS—What's the Difference?" <https://www.globalsign.com/en/blog/ssl-vs-tls-difference/> Feb. 13, 2020.
StackExchange, "Is it ok to send plain-text password over HTTPs? [duplicate]" <https://security.stackexchange.com/questions/110415/is-it-ok-to-send-plain-text-password-over-https> Jan. 12, 2016.
Stack Overflow, "SSL and man-in-the-middle misunderstanding," <https://stackoverflow.com/questions/14907581/ssl-and-man-in-the-middle-misunderstanding> Feb. 16, 2013.

(Continued)

*Primary Examiner* — Izunna Okeke
(74) *Attorney, Agent, or Firm* — Michael Best & Friedrich LLP

(57) ABSTRACT

Security-enhancing devices, systems, methods, and non-transitory computer-readable media for performing non-interactive zero knowledge proof (NIZKP) authentication. In one embodiment, a computing device includes a memory and an electronic processor. The memory stores a NIZKP authentication program and a plurality of unique passwords. The electronic processor is configured to receive a first random value from an electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source.

20 Claims, 7 Drawing Sheets

(56) References Cited

OTHER PUBLICATIONS

Server Fault, "Why do https connections take longer to stablish than straight http connections," <https://serverfault.com/questions/24826/why-do-https-connections-take-longer-to-establish-than-straight-http-connections> Jun. 12, 2009.
Stack Overflow, "How much overhead does SSL impose?" <https://stackoverflow.com/questions/548029/how-much-overhead-does-ssl-impose> Feb. 13, 2009.
Wikipedia, "Zero-knowledge proof," <https://en.wikipedia.org/wiki/Zero-knowledge_proof#Authentication_systems> Jun. 17, 2004.
Wikipedia, "Non-interactive zero-knowledge proof," <https://en.wikipedia.org/wiki/Non-interactive_zero-knowledge_proof> May 17, 2013.
Cossack Labs, "Zero Knowledge Protocols Without Magic," <https://www.cossacklabs.com/blog/zero-knowledge-protocols-without-magic.html> Jul. 27, 2016.
Cryptography, "XOR a set of random numbers," <https://crypto.stackexchange.com/questions/48145/xor-a-set-of-random-numbers> Jun. 10, 2017.
StackExchange, "Can the xor of two RNG outputs ever be less secure than one of them?" <https://security.stackexchange.com/questions/47446/can-the-xor-of-two-rng-outputs-ever-be-less-secure-than-one-of-them> Dec. 21, 2013.
Bernstein, "Salsa20 design," <https://cr.yp.to/snuffle/design.pdf> Apr. 27, 2005.
StackExchange, "Lessons learned and misconceptions regarding encryption and cryptology," <https://security.stackexchange.com/questions/2202/lessons-learned-and-misconceptions-regarding-encryption-and-cryptology/2206#2206> Feb. 19, 2011.
Brown et al., "Dieharder: A Random Number Test Suite, Version 3.31.1," <https://webhome.phy.duke.edu/~rgb/General/dieharder.php> Jul. 3, 2017.
Troy Hunt, "I've Just Launched "Pwned Passwords" V2 With Half a Billion Passwords for Download," <https://www.troyhunt.com/ive-just-launched-pwned-passwords-version-2/> Feb. 22, 2018.
Sullivan, "Do the ChaCha: better mobile performance with cryptography," The Cloudfare Blog, <https://blog.cloudflare.com/do-the-chacha-better-mobile-performance-with-cryptography/> <https://blog.cloudflare.com/do-the-chacha-better-mobile-performance-with-cryptography/> Feb. 23, 2015.
Bernstein, "Shuffle 2005: the Salsa20 encryption function," <https://cr.yp.to/snuffle.html> Apr. 29, 2005.
Wikipedia, "Salsa20," <https://en.wikipedia.org/wiki/Salsa20#ChaCha_variant> Dec. 15, 2005.
High Scalability, "Latency Is Everywhere And It Costs You Sales—How To Crush It," <http://highscalability.com/latency-everywhere-and-it-costs-you-sales-how-crush-it> Jul. 25, 2009.
WonderNetwork, "Global Ping Statistics, Dallas and Washington," <https://wondernetwork.com/pings/Dallas/Washington> publicaly available since May 5, 2012.
Akamai, "Bots Tampering with TLS to Avoid Detection," <https://blogs.akamai.com/sitr/2019/05/bots-tampering-with-tls-to-avoid-detection.html> May 15, 2019.
International Search Report and Written Opinion for Application No. PCT/CA2021/051128 dated Nov. 6, 2021 (9 pages).

\* cited by examiner

```
$ openssl s_client -debug -connect google.com:443 2>&1 | egrep "(read from|write to)" | perl -lane 'print/ qq(%
s\n),$_; if(m~(write to|read from).*\)((\d+) bytes~){ $h->{$1}+=$2; } sub END{ foreach(sort keys %{$h}){ printf
qq(- %u %s bytes\n), $h->{$_}, $_; } }'
write to 0x7fbd08092fdb0 [0x7fbd08b0a10#03] (200 bytes => 200 (0xC8))
read from 0x7fbd08092fdb0 [0x7fbd08b0cc03] (5 bytes => 5 (0x5))
read from 0x7fbd08092fdb0 [0x7fbd08b0cc08] (59 bytes => 59 (0x3B))
read from 0x7fbd08092fdb0 [0x7fbd08b0cc03] (5 bytes => 5 (0x5))
read from 0x7fbd08092fdb0 [0x7fbd08b08d71] (3404 bytes => 2767 (0xACF))
read from 0x7fbd08092fdb0 [0x7fbd08b0cc03] (637 bytes => 637 (0x27D))
read from 0x7fbd08092fdb0 [0x7fbd08b0cc08] (5 bytes => 5 (0x5))
read from 0x7fbd08092fdb0 [0x7fbd08b0cc08] (300 bytes => 300 (0x12C))
read from 0x7fbd08092fdb0 [0x7fbd08b0cc03] (5 bytes => 5 (0x5))
read from 0x7fbd08092fdb0 [0x7fbd08b0cc08] (4 bytes => 4 (0x4))
write to 0x7fbd08092fdb0 [0x7fbd08b15000] (42 bytes => 42 (0x2A))
write to 0x7fbd08092fdb0 [0x7fbd08b15000] (6 bytes => 6 (0x6))
write to 0x7fbd08092fdb0 [0x7fbd08b15000] (37 bytes => 37 (0x25))
read from 0x7fbd08092fdb0 [0x7fbd08b0cc03] (5 bytes => 5 (0x5))
read from 0x7fbd08092fdb0 [0x7fbd08b0cc08] (223 bytes => 223 (0xDF))
read from 0x7fbd08092fdb0 [0x7fbd08b0cc03] (5 bytes => 5 (0x5))
read from 0x7fbd08092fdb0 [0x7fbd08b0cc08] (1 bytes => 1 (0x1))
read from 0x7fbd08092fdb0 [0x7fbd08b0cc03] (5 bytes => 5 (0x5))
read from 0x7fbd08092fdb0 [0x7fbd08b0cc08] (32 bytes => 32 (0x20))
read from 0x7fbd08092fdb0 [0x7fbd08b0cc03] (5 bytes => 0 (0x0))
write to 0x7fbd08092fdb0 [0x7fbd08b10#03] (23 bytes => 23 (0x17))
- 4700 read from bytes
- 308 write to bytes
```

FIG. 4

```
$ openssl s_client -debug -connect linkedin.com:443 2>&1 | egrep "(read from|write to)" | perl -lane 'printf qq[%s\n],$_; if(m~(write to|read from).*\((\d+) bytes~){ $h->{$1}+=$2; } sub END{ foreach(sort keys %{$h}){ printf qq[- %u %s bytes\n], $h->{$_}, $_; } }'
write to 0x7f91bb433db0 [0x7f91bb810603] (300 bytes => 200 (0xC8))
read from 0x7f91bb433db0 [0x7f91bb80c403] (5 bytes => 5 (0x5))
read from 0x7f91bb433db0 [0x7f91bb80c408] (61 bytes => 61 (0x3D))
read from 0x7f91bb433db0 [0x7f91bb80c403] (5 bytes => 5 (0x5))
read from 0x7f91bb433db0 [0x7f91bb80c408] (3062 bytes => 3062 (0xBF6))
read from 0x7f91bb433db0 [0x7f91bb80c403] (5 bytes => 5 (0x5))
read from 0x7f91bb433db0 [0x7f91bb80c408] (300 bytes => 300 (0x12C))
read from 0x7f91bb433db0 [0x7f91bb80c403] (5 bytes => 5 (0x5))
read from 0x7f91bb433db0 [0x7f91bb80c408] (4 bytes => 4 (0x4))
write to 0x7f91bb433db0 [0x7f91bb814800] (42 bytes => 42 (0x2A))
write to 0x7f91bb433db0 [0x7f91bb814800] (6 bytes => 6 (0x6))
write to 0x7f91bb433db0 [0x7f91bb814800] (45 bytes => 45 (0x2D))
read from 0x7f91bb433db0 [0x7f91bb80c403] (5 bytes => 5 (0x5))
read from 0x7f91bb433db0 [0x7f91bb80c408] (202 bytes => 202 (0xCA))
read from 0x7f91bb433db0 [0x7f91bb80c403] (1 bytes => 1 (0x1))
read from 0x7f91bb433db0 [0x7f91bb80c403] (5 bytes => 5 (0x5))
read from 0x7f91bb433db0 [0x7f91bb80c408] (40 bytes => 40 (0x28))
read from 0x7f91bb433db0 [0x7f91bb80c403] (5 bytes => 5 (0x5))
read from 0x7f91bb433db0 [0x7f91bb80c408] (26 bytes => 26 (0x1A))
write to 0x7f91bb433db0 [0x7f91bb810603] (31 bytes => 31 (0x1F))
- 3736 read from bytes
- 324 write to bytes
```

```
$ openssl s_client -debug -connect mastercard.com:443 2>&1 | egrep "(read from|write to)" | perl -lane 'printf
qq{%s\n},$_; if(m-(write to|read from).*\((\d+) bytes-){($1)+=$2; } sub END{ foreach(sort keys %{$h}){
printf qq{- %u %s bytes\n}, $h->{$_}, $_; } }'
write to 0x7ff041d38df0 [0x7ff042011803] (300 bytes => 300 (0xC8))
read from 0x7ff041d38df0 [0x7ff042006031] (5 bytes => 5 (0x5))
read from 0x7ff041d38df0 [0x7ff042006080] (53 bytes => 53 (0x35))
read from 0x7ff041d38df0 [0x7ff042006031] (5 bytes => 5 (0x5))
read from 0x7ff041d38df0 [0x7ff042006080] (6291 bytes => 3981 (0x78D))
read from 0x7ff041d38df0 [0x7ff042006595] (2310 bytes => 2310 (0x906))
read from 0x7ff041d38df0 [0x7ff042006031] (5 bytes => 5 (0x5))
read from 0x7ff041d38df0 [0x7ff042006080] (525 bytes => 525 (0x20D))
read from 0x7ff041d38df0 [0x7ff042006031] (5 bytes => 5 (0x5))
read from 0x7ff041d38df0 [0x7ff042006080] (4 bytes => 4 (0x4))
write to 0x7ff041d38df0 [0x7ff042016a00] (139 bytes => 139 (0x8B))
write to 0x7ff041d38df0 [0x7ff042016a00] (6 bytes => 6 (0x6))
write to 0x7ff041d38df0 [0x7ff042016a00] (53 bytes => 53 (0x35))
read from 0x7ff041d38df0 [0x7ff042006031] (5 bytes => 5 (0x5))
read from 0x7ff041d38df0 [0x7ff042006080] (202 bytes => 202 (0xCA))
read from 0x7ff041d38df0 [0x7ff042006031] (5 bytes => 5 (0x5))
read from 0x7ff041d38df0 [0x7ff042006080] (1 bytes => 1 (0x1))
read from 0x7ff041d38df0 [0x7ff042006031] (5 bytes => 5 (0x5))
read from 0x7ff041d38df0 [0x7ff042006080] (48 bytes => 48 (0x30))
read from 0x7ff041d38df0 [0x7ff042006031] (5 bytes => 5 (0x5))
read from 0x7ff041d38df0 [0x7ff042006080] (32 bytes => 32 (0x20))
write to 0x7ff041d38df0 [0x7ff042011803] (37 bytes => 37 (0x25))
- 9506 read from bytes
- 435 write to bytes
```

FIG. 6

DEVICES, SYSTEMS, METHODS, AND COMPUTER-READABLE MEDIA FOR ZERO KNOWLEDGE PROOF AUTHENTICATION

FIELD OF THE INVENTION

The present disclosure relates generally to secure authentication. More specifically, the present disclosure relates to devices, systems, methods, and computer-readable media for zero knowledge proof authentication.

BACKGROUND

Traditional authentication uses a username and a password via Secure Socket Layers (SSL). SSL is cryptographic protocol that provides authentication and data encryption between computing devices over a network. For example, a browser of a first computing device establishes an encrypted SSL tunnel with a server. A plain text username and password is sent over the encrypted SSL tunnel. The password is salted and hashed on the server side and compared with a previously stored hash associated with the username to provide authentication.

Conventional SSL has several fundamental disadvantages. First, if the encrypted SSL tunnel is compromised, then the plain text username and password may be read by a nefarious actor, which is referred to as an attack "by a man in the middle." Second, if the server is compromised, a "hacked server" attack, then the plain text username and password may be read by a nefarious actor. Third, SSL requires management of SSL certificates, and expired SSL certificates may allow a nefarious actor to compromise the SSL tunnel. Fourth, an SSL connection handshake uses a ping-pong technique, which is slow and is even slower when the distance between the computing device and the server is a large distance (e.g., where the distance between the computing device and the server is either hundreds or thousands of miles apart from each other).

SUMMARY

The non-interactive zero knowledge proof (also referred to herein as "NIZKP") authentication of the present disclosure improves latency due to no ping pong of SSL connections and enhances security due to zero knowledge, i.e., no transmission of username or password. With NIZKP authentication, the computing device must prove to the server (or the server must prove to the computing device) that the computing device has the password without sharing the password (or info about the password) to the server.

NIZKP authentication of the present disclosure has a number of advantages over conventional SSL. One advantage is NIZKP authentication is non-interactive and there is no need to establish a connection or play packet ping-pong. For example, the NIZKP authentication may be used via a single direction user datagram protocol (also referred to herein as "UDP"). Another advantage is NIZKP authentication hides both username and password. In other words, NIZKP authentication prevents both man-in-the-middle attacks and hacked server attacks.

NIZKP authentication is also safe from replay attacks. NIZKP authentication is a "one shot" authentication and fails after one authentication attempt.

NIZKP authentication also does not require expensive cryptographic code on both the server side and the client side. Instead the NIZKP authentication only requires expensive cryptographic code on the client side, which increases the overall available computational resources in the server. Consequently, a server using NIZKP authentication may network with more clients than an server using convention SSL authentication.

NIZKP authentication also does not use two packets that look the same. This prevents an issue with symmetric encryption, where a salt is sent as plain text as part of the symmetric encryption. However, the transmission of the salt also unnecessarily leaks knowledge.

One embodiment of the present disclosure includes a computing device including a memory and an electronic processor communicatively connected to the memory. The memory stores a non-interactive zero knowledge proof authentication program and a plurality of unique passwords. The electronic processor is configured to receive a first random value from an electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source.

Another embodiment of the present disclosure includes a system including an electronic source and a server. The electronic source is configured to output a first random value. The server includes a memory and an electronic processor communicatively connected to the memory. The memory stores a non-interactive zero knowledge proof authentication program and a plurality of unique passwords. The electronic processor is configured to receive the first random value from the electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source.

Another embodiment of the present disclosure includes a method. The method includes receiving, with an electronic processor, a first random value from an electronic source. The method includes generating, with the electronic processor, a second random value by performing an exclusive disjunction operation on the first random value with a first password from a plurality of unique passwords. The method includes performing, with the electronic processor, an extraction operation on the second random value. The method includes determining, with the electronic processor, whether the extraction operation performed on the second random value extracted a non-random value from the second random value. The method also includes authenticating, with the electronic processor, communications with the electronic source in response to determining that the extraction operation performed on the second random value extracted the non-random value from the second random value.

Yet another embodiment of the present disclosure includes a non-transitory computer-readable medium comprising instructions that, when executed by an electronic processor, causes the electronic processor to perform a set of operations. The set of operations includes generating a second random value by performing an exclusive disjunction operation on a first random value with a first password from a plurality of unique passwords, the first random value being received from an electronic source. The set of operations includes performing an extraction operation on the second random value. The set of operations includes determining whether the extraction operation performed on the second random value extracted a non-random value from the second random value. The set of operations also includes authenticating communications with the electronic source in response to determining that the extraction operation performed on the second random value extracted the non-random value from the second random value.

BRIEF DESCRIPTION OF THE FIGURES

FIGS. 4-6 are diagrams illustrating bytes transferred with different example SSL handshakes to various Internet websites.

DETAILED DESCRIPTION OF THE EMBODIMENTS

Figure 1:
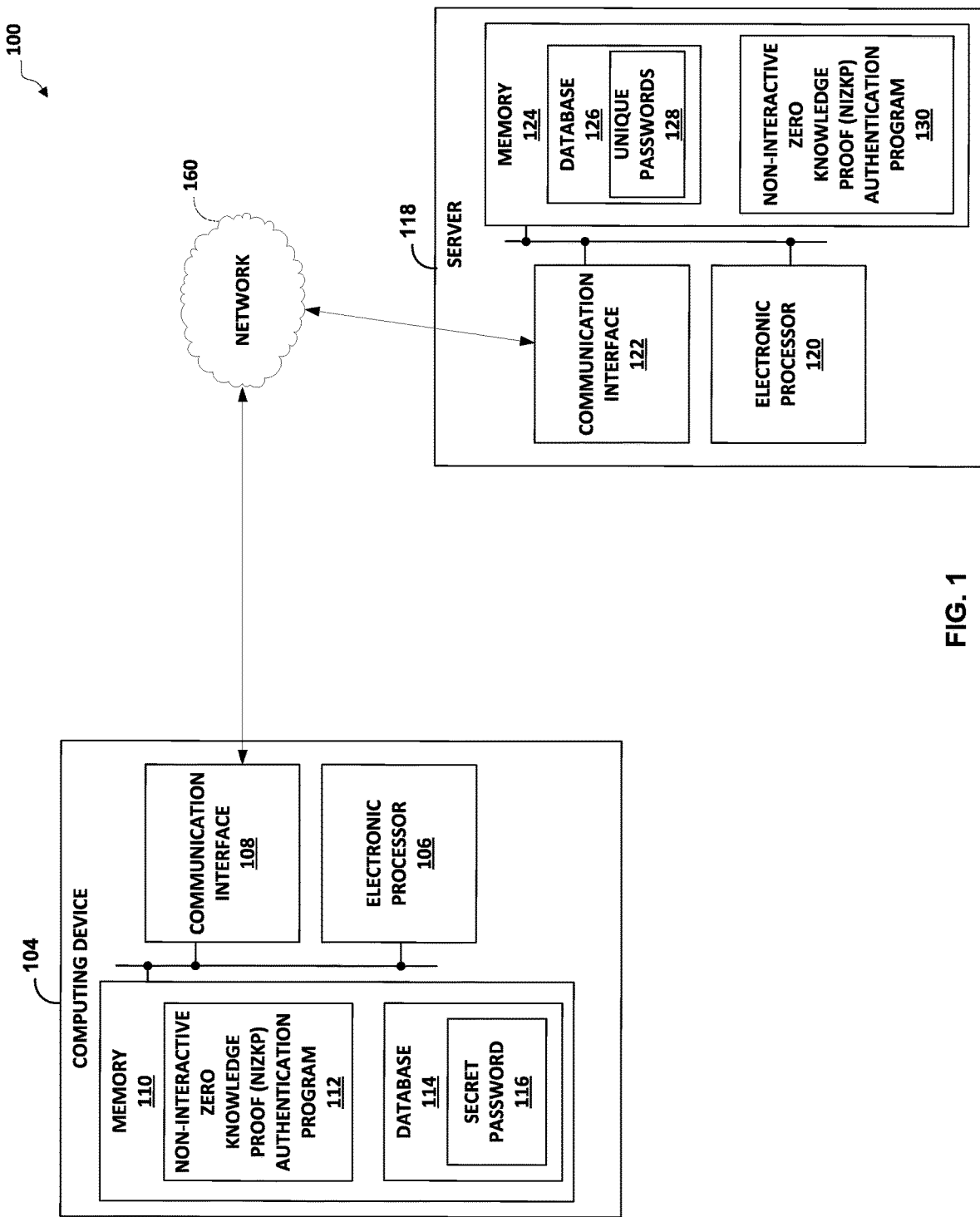
FIG. 1 illustrates an example system for performing non-interactive zero knowledge (NIZKP) authentication between two devices.

FIG. 1 illustrates an example system 100 for performing non-interactive zero knowledge (NIZKP) authentication between two devices. In the example of FIG. 1, the system 100 includes a computing device 104, a server 118, and a network 160.

The server 118 may be owned by, or operated by or on behalf of, an administrator. The server 118 may also be implemented by one or more networked computer servers.

The computing device 104 includes an electronic processor 106, a communication interface 108, and a memory 110. The electronic processor 106 is communicatively coupled to the communication interface 108 and the memory 110. The electronic processor 106 is a microprocessor or another suitable processing device. The communication interface 108 may be implemented as one or both of a wired network interface and a wireless network interface. The memory 110 is one or more of volatile memory (e.g., RAM) and non-volatile memory (e.g., ROM, FLASH, magnetic media, optical media, et cetera). In some examples, the memory 110 is also a non-transitory computer-readable medium. Although shown within the computing device 104, memory 110 may be, at least in part, implemented as network storage that is external to the computing device 104 and accessed via the communication interface 108. For example, all or part of memory 110 may be housed on the "cloud." The memory 110 includes a non-interactive zero knowledge proof (NIZKP) authentication program 112 and a database 114 for storing a secret password 116. Additionally, in some examples, the memory 110 may be similar to the memory 124 as described herein.

The server 118 includes an electronic processor 120, a communication interface 122, and a memory 124. The electronic processor 120 is communicatively coupled to the communication interface 122 and the memory 124. The electronic processor 120 is a microprocessor or another suitable processing device. The communication interface 122 may be implemented as one or both of a wired network interface and a wireless network interface. The memory 124 is one or more of volatile memory (e.g., RAM) and non-volatile memory (e.g., ROM, FLASH, magnetic media, optical media, et cetera). In some examples, the memory 124 is also a non-transitory computer-readable medium. The memory 124 may be, at least in part, implemented as network storage that is external to the server 118 and accessed via the communication interface 122. For example, all or part of memory 124 may be housed on the "cloud." The memory 124 includes a non-interactive zero knowledge proof (NIZKP) authentication program 130 and a database 126 for storing unique passwords 128 (e.g., a plurality of unique pre-computed passwords). Additionally, in some examples, the memory 124 may also include a plurality of usernames that are associated with the unique passwords 128 on a one-to-one basis. Further, in some examples, the memory 124 may be similar to the memory 110 as described herein.

In the NIZKP authentication program 112, the electronic processor 106 may use exclusive disjunction on the input sha256(password) with another random input. The result of this operation is an equally random output having 64 hexadecimal digits. For example, if 0x6243c4b3a0cdd23f79e7922f62a54f23844b69311 65d4c7d843e4ffc450d3d4d is a sha256(password) input and 0x059f7f263ead df59b935e200bda331690694f8f52d5505de088ac5248e87 d05e is a random 32 bytes of input, then 0x67dcbb959e600d66c0d2702fdf067e4a82d191c43b0849a 38cb48 ad8cb8aed13 is the random exclusive junction output after using the exclusive disjunction on the inputs and the random exclusive disjunction output is just as random as the inputs.

In the above example, if the computing device 104 sends the random exclusive disjunction output then, with the non-interactive zero knowledge proof (NIZKP) authentication program 130, the server 118 may determine the random 32 bytes when the server 118 already has the sha256 (password). Without the sha256(password), then the server 118 cannot determine the random 32 bytes because the random 32 bytes and the random exclusive disjunction output are both random.

Assuming the server 118 has the sha256(password) (e.g., one of the unique passwords 128), the server 118 may use the sha256(password) to extract the random 32 bytes. Additionally, the server 118, with the NIZKP authentication program 130, may also extract miscellaneous hidden data in the random 32 bytes. The server 118 may then authenticate (e.g., authenticate like a checksum) the miscellaneous hidden data to confirm that the secret password 116 stored in the database 114 on the computing device 104 is the same as the one of the unique passwords 128 stored in the database 126 on the server 118. This is NIZKP authentication because neither the secret password 116 nor information regarding the secret password 116 were sent from the computing device 104 to the server 118.

The very fast exclusive disjunction operation can be used on the server side. Exclusive disjunction of random numbers together—if done correctly—does not make the resulting random number less random than the inputs. Exclusive disjunction using cryptographic hashes for encryption has been done before, but requires expensive cryptographic hashing to be performed during decryption. However, the expensive cryptographic hashing in the NIZKP authentication may be avoided by pre-computing the password hashes and supplying random numbers.

The NIZKP authentication program 112 on the computing device 104 further includes instructions for combining exclusive disjunction and an extraction operation (e.g., subtraction) to hide a non-random value (i.e., the miscellaneous hidden data as described above) in a random number (i.e., the random 32 bytes as described above). For example, if 0x0f2ff0ff19ffffffffff0f5ff2f42fff2fffff4fffff4ff5fff9 is the non-random value to hide and 0xef7947a61fedfe7c328a62a525475da7b875aaef7d36c4ef ada e16642847a234 is the random number, then 0xfea946b6118dfe7c328a61b485468cea b874daef7d3614efadae0b641e47a22d is the value after subtraction. Further, if the sha256(password) as described above (i.e., 0x7e6334409599adb7678774c1fb26 0709e59d44938f06d072d0ee297dee82dd51) has an exclusive disjunction operation (i.e., XORed) with 0xfea946b6118dfe7c328a61b4 85468ceab874daef7d3614efadae0b641e47a22d, then 0x80ca72f6841453cb550d15757e6 08be35de99e7cf230c49d7d402219f0c57f7c is the resulting random value as well as the random value used for subtraction are output from the computing device 104 to the server 118.

The NIZKP authentication program 130 on the server 118 further includes the inverse instructions for extracting the hidden non-random value from the random value received from the computing device 104. For example, the random value 0xfea9 46b6118dfe7c328a61b485468ceab874daef7d3614efadae 0b641e47a22d may have an exclusive disjunction operation (i.e., XORed) with sha256(password) that extracts 0xfea946b6118dfe7c328a61b485468ceab874daef7d3614ef adae0b641e47a22d. The random number to be used for subtraction (previously received from the computing device 104) may then subtracted from 0xfea946b6118dfe7c328a61b485468ce ab874daef7d3614efadae0b641e47a22d to determine the non-random value, i.e., 0x0f2ff f0ff19ffffffffff0f5ff2f42fff2fffff4fffff4ff5fff9.

In some examples, the NIZKP authentication program 130 knows that the non-random value is not random because the non-random value is a value that may be identified as non-random. For example, the non-random value may be identified as a timestamp that is randomly inflated to a 256 bit number and within a predetermined temporal threshold or other suitable 256 bit value that may be identified as non-random. Specifically, "randomly inflated" means inserting a number of hexadecimal characters of value "f" at random locations between the first and last characters until the string length reaches 64 hexadecimal characters.

The time stamp acts as both the authentication and checksum as well as the mechanism to avoid a replay attack. By including the timestamp twice in the 256 bit number, the timestamp may be authenticated when the two timestamps are the same. Further, by limiting authentication to within the predetermined temporal threshold, when the two timestamps are outside the predetermined temporal threshold, the two timestamps are "old" and will automatically fail authentication.

Figure 2:
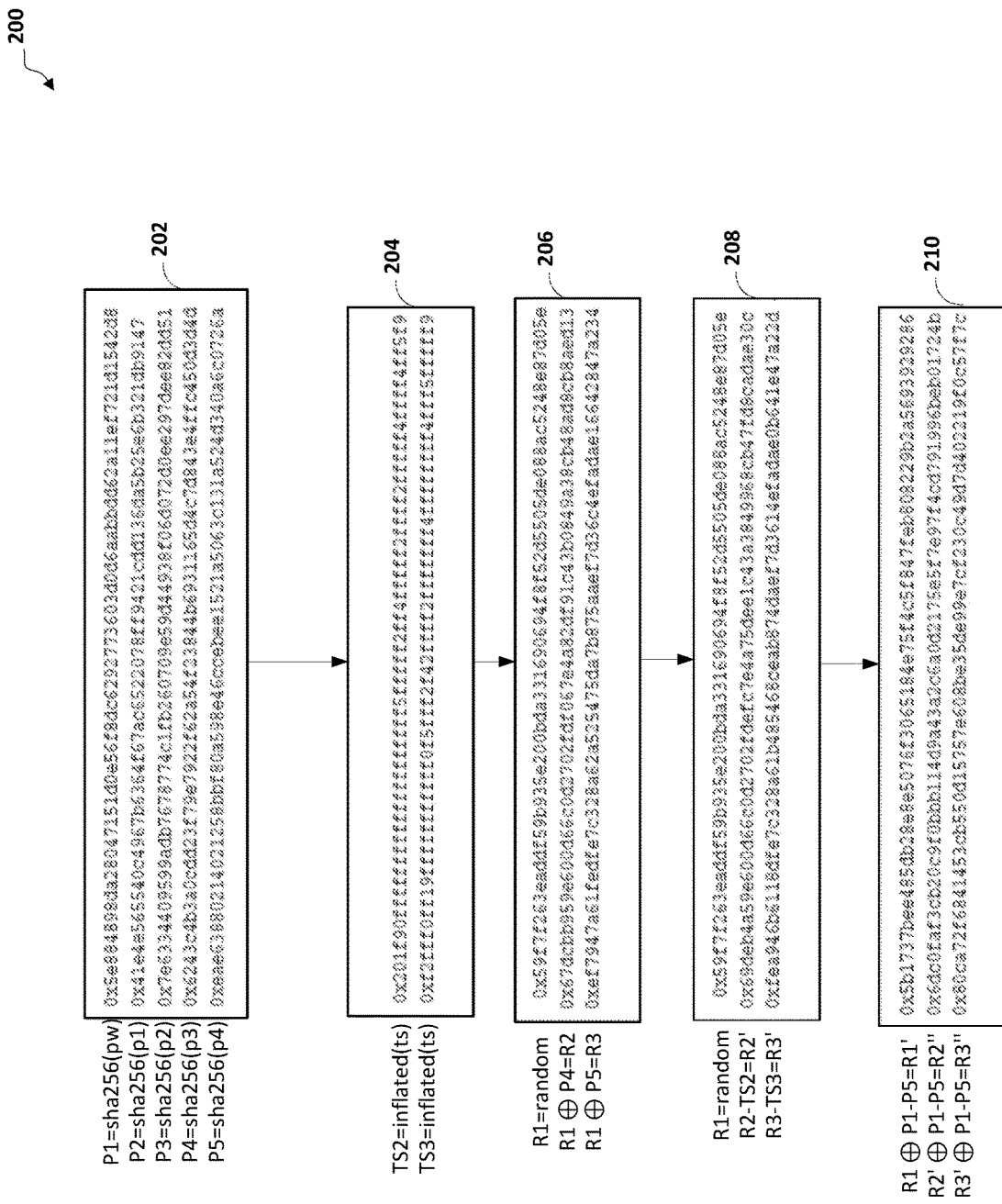
FIG. 2 is a flowchart illustrating example operations of the NIZKP authentication program that is executed by the electronic processor of the computing device in FIG. 1.

FIG. 2 is a flowchart illustrating example operations 200 of the NIZKP authentication program 112 that is executed by the electronic processor 106 of the computing device 104 in FIG. 1. For ease of understanding, a high-level summary is illustrated to the left of the flowchart illustrating the example operations 200 of the NIZKP authentication program 112. Each string of 64 hexadecimal characters corresponds to the summary directly to left of the individual string. In other words, the high-level summary is a high-level summary of the example operations 200 of the NIZKP authentication program 112.

As illustrated in FIG. 2, the NIZKP authentication program 112 includes the electronic processor 106 determining a 256×5 cryptographic hash from the sha256(password) as described above (at block 202). The NIZKP authentication program 112 further includes the electronic processor 106 determining a timestamp and inflating the timestamp randomly twice (at block 204). The NIZKP authentication program 112 also includes the electronic processor 106 generating one 256 bit random number r1 and another two 256 bit random numbers r2 and r3 by exclusive disjunction with p4 and p5 of the 256×5 cryptographic hash and with r1, respectively (at block 206). As illustrated in FIG. 2, the NIZKP authentication program 112 includes the electronic processor 106 subtracting the inflated timestamps from r2 and r3, respectively, to determine r2' and r3' (at block 208). As illustrated in FIG. 2, the NIZKP authentication program 112 also includes the electronic processor 106 performing an exclusive disjunction operation on r1, r2', and r3' with the 256×5 cryptographic hash to determine random output r1', r2", and r3" (at block 210). The random output r1', r2", and r3" is the random output sent to the server 118. Moreover, the randomness of the random output has been confirmed by "dieharder," which is a comprehensive set of software tests developed by Duke University for analyzing a stream of bytes for randomness, to have a randomness that is as good as the randomness of a stream of cryptographic random numbers generated by sha256( ).

Figure 3:
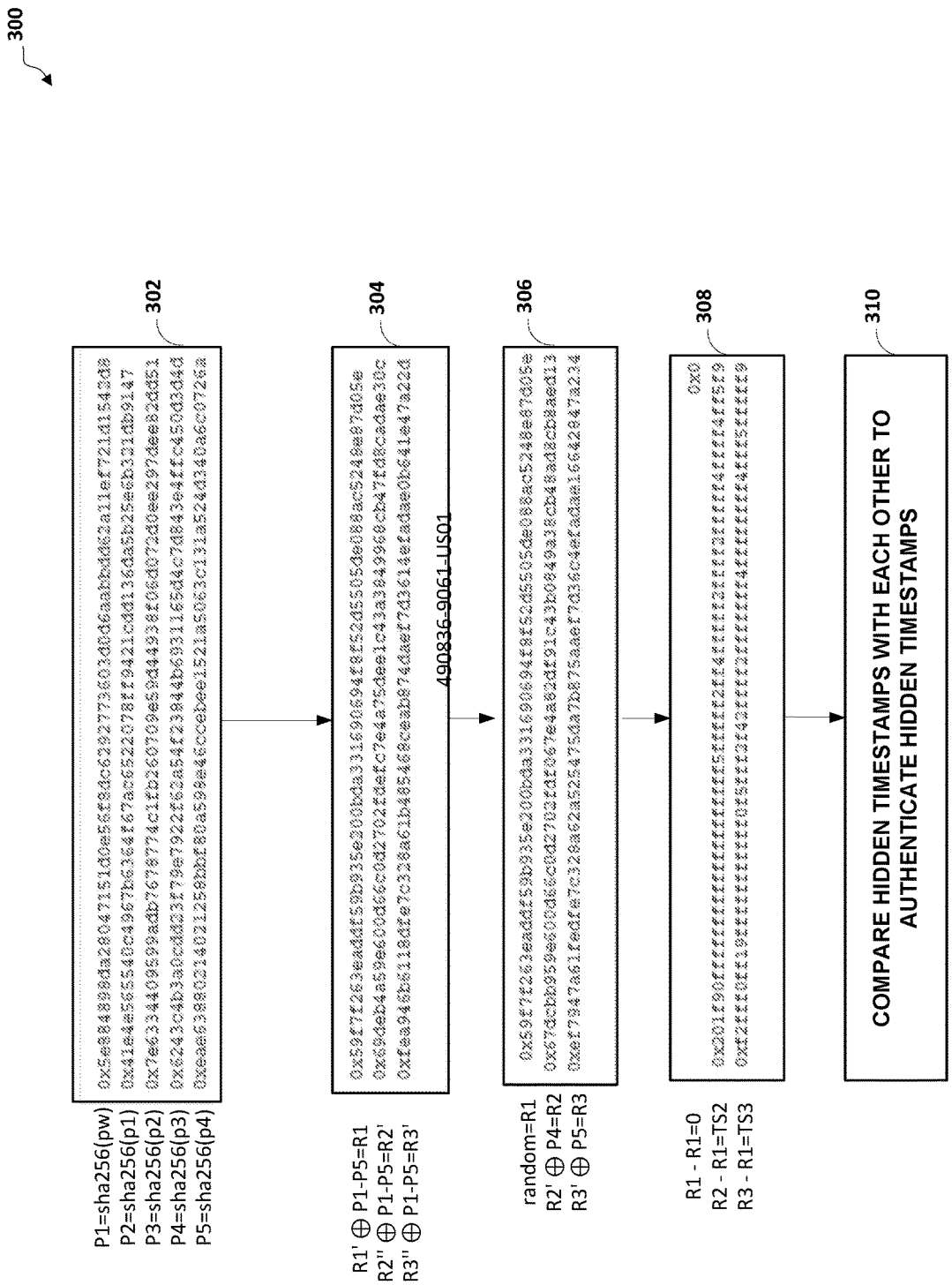
FIG. 3 is a flowchart illustrating example operations of the NIZKP authentication program that is executed by the electronic processor of the server in FIG. 1.

FIG. 3 is a flowchart illustrating example operations 300 of the NIZKP authentication program 130 that is executed by the electronic processor 120 of the server 118 in FIG. 1. For ease of understanding, a high-level summary is illustrated to the left of the flowchart illustrating the example operations 300 of the NIZKP authentication program 130. Each string of 64 hexadecimal characters corresponds to the summary directly to left of the individual string. In other words, the high-level summary is a high-level summary of the example operations 300 of the NIZKP authentication program 130.

As illustrated in FIG. 3, the NIZKP authentication program 130 includes the electronic processor 120 determining a 256×5 cryptographic hash from the sha256(password) as described above (at block 302). The NIZKP authentication program 130 further includes the electronic processor 120 performing an exclusive disjunction operation on r1', r2", and r3" with the 256×5 cryptographic hash to determine random numbers r1, r2', and r3' (at block 304). The NIZKP authentication program 130 further includes the electronic processor 120 determining r2 and r3 by performing an exclusive disjunction operation on p4 and p5 of the 256×5 cryptographic hash with r1, respectively (at block 306). The NIZKP authentication program 130 also includes the electronic processor 120 subtracting r1, r2 and r3 from r1, r2', and r3', respectively, to reveal the hidden timestamp (at block 308). The NIZKP authentication program 130 further includes the electronic processor 120 deflating the hidden timestamps and comparing the hidden timestamps with each other to authenticate the hidden timestamps (at block 310).

In some examples, the electronic processor 120 may also compare the hidden timestamps to a second timestamp that is internal to the server 118 and further authenticate the hidden stamps when the hidden timestamps are within a predetermined temporal threshold (e.g., 1 second). Additionally, although the authentication has been described above as being performed on the server 118, the alternative of FIGS. 2 and 3 is also part of the present disclosure (i.e., the operations described above with respect to the NIZKP authentication programs 112 and 130 may be switched). Put simply, the NIZKP authentication program 112 may be implemented by the server 118 instead of the computing device 104 and the NIZKP authentication program 130 may be implemented by the computing device 104 instead of the server 118. If authentication is performed on both the server 118 and computing device 104, this dual authentication allows the computing device 104 to determine that the server 118 also has the password stored in the database 126.

Further, in executing the NIZKP authentication program 130, the electronic processor 120 does not receive any information other than the random output provided by the computing device 104. Therefore, the electronic processor 120 does not target a specific password associated with a specific user because the electronic processor 120 only receives the random output. Instead, the electronic processor 120 processes all of the passwords stored in the database 126 until one of the passwords in the database 126 cause the electronic processor 120 to extract and authenticate the hidden timestamps. The electronic processor 120 may then assume a user associated with the password that causes the electronic processor 120 to extract and authenticate the hidden timestamps is the user of the computing device 104.

In some examples, to accelerate execution of the NIZKP authentication program 130, the determination of the 256×5 cryptographic hash from the sha256(password) may be pre-calculated for every password stored in the database 126 and separately stored in the database 126. By pre-calculating all of the 256×5 cryptographic hashes, only the exclusive disjunction and subtract operations at blocks 304-308 are used to try a password. Put simply, the determination at block 302 of the NIZKP authentication program 130 is optional if all of the 256×5 cryptographic hashes are pre-calculated.

Assuming that 160 million passwords may be tested on a thirty-two core box with a fast exclusive disjunction and subtraction algorithm and the desired maximum latency is 1 millisecond (ms), then 160,000 tests may be performed per password search box. Further, assuming there are 1 million usernames, then those usernames may be separated between roughly seven password search boxes in the server 118 using a request URL. Moreover, an attacker would only know that the username is one of the 160,000 usernames in each password search box. Furthermore, if the random bytes to be tested have been sent via TCP connection then all other requests on that connection come from the same authenticated source using the same password.

Additionally, in some examples, NIZKP authentication programs 112 and 130 include instructions to encrypt the request body that is sent between the computing device 104 and the server 118. The request body is encrypted information that follows the authentication header that is described. This encrypted information may be anything that needs to be communicated. For example, NIZKP authentication programs 112 and 130 may include instructions to encrypt the request body with AES-256 encryption. Conventionally, AES-256 encryption requires a salt to be sent as plain text in order to randomize bytes and avoid sending the same and identical encrypted data bytes twice if the plain text does not change from request to request. However, in some examples, the NIZKP authentication programs 112 and 130 may include instructions to derive the AES-256 salt from the recovered random number r1 in the NIZKP authentication program 130 as described above. By deriving the AES-256 salt from the recovered random number r1, no data whatsoever is leaked to the server as part of the request.

Conventionally, AES-256-GCM includes built in authentication that does not require the timestamp to be duplicated. However, as explained above, AES-256 requires a salt to be sent in plain text next to the encrypted bytes which is a potential attack vector. Moreover, unencrypting AES-256 is slower than performing the NIZKP authentication program 130 because searching for the correct password would be prohibitively slow. Furthermore, to address the slowness of searching for the correct password, the username would have to be sent as plain text (an additional attack vector) or via SSL (same disadvantages as described above).

FIGS. 4-6 are diagrams illustrating bytes transferred with different example SSL handshakes 400-600 to various Internet websites. For example, as illustrated in FIG. 4, an example SSL handshake 400 with Google.com required 4700 read-from bytes and 308 write-to bytes. Similarly, as illustrated in FIG. 5, an example SSL handshake 500 with Linkedin.com required 3736 read-from bytes and 324 write-to bytes. Further, as illustrated in FIG. 6, an example SSL handshake 600 with Mastercard.com required 9506 read-from bytes and 435 write-to bytes. Moreover, these results from the example SSL handshakes 400-600 only include results from handshaking and do not include the bytes necessary for sending the username and password after the SSL connection has been established. Comparatively, NIZKP authentication as described herein may use as little as 96 read-from bytes and as little as 96 write-to bytes in authenticating the connection between the computing device 104 and the server 118.

One additional requirement of NIZKP authentication programs 112 and 130 is that all passwords stored in the database 126 must be unique. Further, all of the passwords should ideally be unique for both current and previous passwords used for the service, and if possible, unique in terms of the greater than 500 million passwords that have already be compromised by nefarious actors. If two or more passwords happen to be the same, then the wrong username may identified by the server 118.

Another additional aspect of NIZKP authentication programs 112 and 130 is that requests may be sent in an acceleration service race via UDP (mostly faster than TCP) as an additional request in the race. This additional request will further improve latency in addition to the elimination of the ping pong protocol associated with the SSL handshake. For example, a customer located in Dallas, Tex. and sending to a region east near Washington, D.C. may have an average ping time between 30 to 50 milliseconds (ms). Therefore, in an example without the NIZKP authentication programs 112 and 130 as described above, the customer in Dallas may need 120 ms to establish an SSL connection, 40 ms to transmit data, and 150 ms for processing by the server, which means the entire interaction would take 310 ms from the point-of-view of the customer in Dallas. However, in an example with the NIZKP authentication programs 112 and 130 as described above (i.e., also referred to as "NIZKP racing"), the customer in Dallas still has a 40 ms or less data transmission time (fastest in the race), a 1 ms delay for password authentication and username search, and a 150 ms delay for processing by the server, which means that the interaction would take 191 ms or less from the point-of-view of the customer in Dallas. Put simply, the NIZKP racing has a significant decrease in latency (e.g., 191 ms versus 310 ms) by the elimination of the SSL connection along with the use of an acceleration service.

Figure 7:
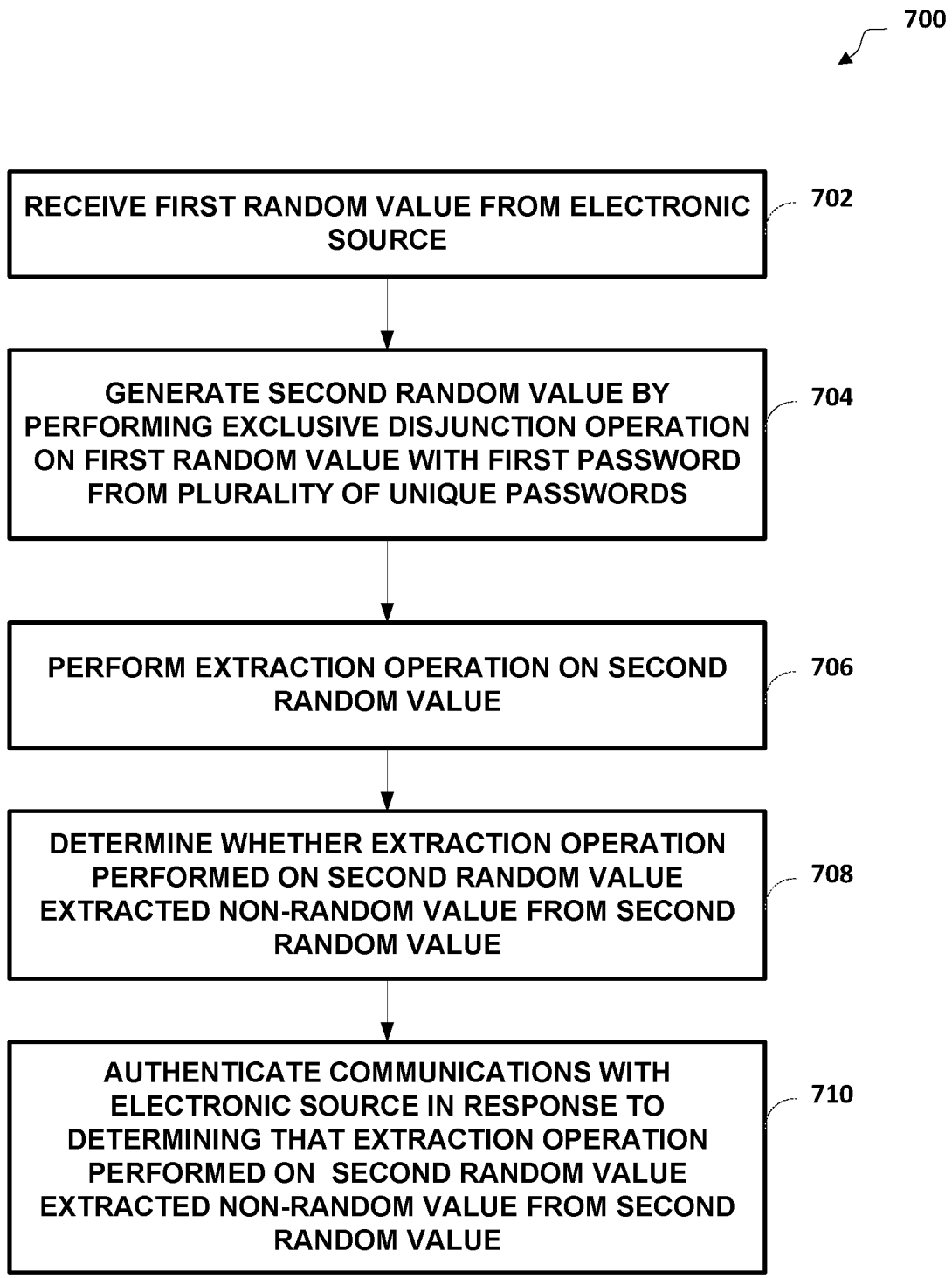
FIG. 7 is a flowchart illustrating an example method 700 for performing non-interactive zero knowledge proof (NIZKP) authentication.

FIG. 7 is a flowchart illustrating an example method 700 for performing non-interactive zero knowledge proof (NIZKP) authentication. FIG. 7 is described with respect to the server 118 of FIG. 1. However, the method 700 is not limited to implementation by the server 118, but instead, may be implemented by a distribution of operations across or more servers or by the computing device 104.

As illustrated in FIG. 7, the method 700 includes receiving, with an electronic processor, a first random value from an electronic source (at block 702). For example, the electronic processor 120 receives a first random value from the computing device 118.

The method 700 includes generating, with the electronic processor, a second random value by performing an exclusive disjunction operation on the first random value with a first password from a plurality of unique passwords (at block 704). For example, the electronic processor 120 generates a second random value by performing an exclusive disjunction operation on the first random value with a sha256 hash of the password.

The method 700 includes performing, with the electronic processor, an extraction operation on the second random value (at block 706). For example, the electronic processor 120 subtracts a third random value from the second random value.

The method 700 includes determining, with the electronic processor, whether the extraction operation performed on the second random value extracted a non-random value from the second random value (at block 706). For example, the electronic processor 120 determines that the subtraction of the third random value from the second random value generates a non-random value, i.e., a timestamp.

The method 700 also includes authenticating, with the electronic processor, communications with the electronic source in response to determining that the extraction operation performed on the second random value extracted the non-random value from the second random value. For example, the electronic processor 120 controls the communication interface 122 to authenticate communications from the computing device 118 in response to determining that the subtraction of the third random value from the second random value generates a non-random value.

Additionally, in some examples, the method 700 may further include generating, with the electronic processor, a third random value by performing a second exclusive disjunction operation on the first random value with a second password of the plurality of unique passwords in response to determining that the extraction operation performed on the second random value did not extract the non-random value from the second random value, performing, with the electronic processor, an extraction operation on the third random value, determining, with the electronic processor, whether the extraction operation performed on the third random value extracted the non-random value from the third random value; and authenticating, with the electronic processor, the communications with the electronic source in response to determining that the extraction operation performed on the third random value extracted the non-random value from the third random value.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A computing device comprising:
a memory that stores a non-interactive zero knowledge proof authentication program and a plurality of unique passwords; and
an electronic processor communicatively connected to the memory, the electronic processor configured to
receive a first random value from an electronic source,
generate a second random value by performing an exclusive disjunction operation on the first random value with a first password of the plurality of unique passwords,
perform an extraction operation on the second random value,
determine whether the extraction operation performed on the second random value extracted a non-random value from the second random value, and
responsive to determining that the extraction operation performed on the second random value extracted the non-random value from the second random value, authenticate communications with the electronic source,
wherein responsive to determining that the extraction operation performed on the second random value did not extract the non-random value from the second random value, the electronic processor is further configured to
generate a third random value by performing a second exclusive disjunction operation on the first random value with a second password of the plurality of unique passwords,
perform an extraction operation on the third random value,
determine whether the extraction operation performed on the third random value extracted the non-random value from the second random value, and
responsive to determining that the extraction operation performed on the third random value extracted the non-random value from the second random value, authenticate the communications with the electronic source.

2. A computing device comprising:
a memory that stores a non-interactive zero knowledge proof authentication program and a plurality of unique passwords; and
an electronic processor communicatively connected to the memory, the electronic processor configured to
receive a first random value from an electronic source,
generate a second random value by performing an exclusive disjunction operation on the first random value with a first password of the plurality of unique passwords,
perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source, wherein the electronic processor is further configured to generate a third random value by performing an insertion operation of a second non-random value into a fourth random value, generate a fifth random value by performing a second exclusive disjunction operation on the fourth random value with a second password, and control a communication interface to transmit the fourth random value and the fifth random value.

3. A computing device comprising:

a memory that stores a non-interactive zero knowledge proof authentication program and a plurality of unique passwords; and an electronic processor communicatively connected to the memory, the electronic processor configured to receive a first random value from an electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source, wherein the non-random value includes a timestamp inflated into a 256-bit number, and wherein, to authenticate the communications with the electronic source, the electronic processor is further configured to extract the timestamp from the 256-bit number, determine whether the timestamp is within a predetermined temporal threshold, and authenticate the communications with the electronic source in response to the timestamp being within the predetermined temporal threshold.

4. A computing device comprising:

a memory that stores a non-interactive zero knowledge proof authentication program and a plurality of unique passwords; and an electronic processor communicatively connected to the memory, the electronic processor configured to receive a first random value from an electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source, wherein the electronic processor is further configured to determine a 256×5 cryptographic hash from the first password, wherein the first random value is a first set of three random numbers $r1'$, $r2''$, and $r3''$, and wherein, to generate the second random value by performing the exclusive disjunction operation on the first random value with the first password of the plurality of unique passwords, the electronic processor is further configured to perform the exclusive disjunction operation on the first set of three random numbers $r1'$, $r2''$, and $r3''$ with the 256×5 cryptographic hash to determine a second set of three random numbers $r1$, $r2'$, and $r3'$, the second set of three random numbers $r1$, $r2'$, and $r3'$ is the second random value.

5. The computing device of claim 4, wherein, to perform the extraction operation on the second random value, the electronic processor is further configured to perform a second exclusive disjunction on a portion of the 256×5 cryptographic hash with the random number $r1$ to determine a third set of random numbers $r2$ and $r3$, and subtract random numbers $r1$, $r2$, and $r3$ from the second set of three random numbers $r1$, $r2'$, and $r3'$ to extract the non-random value.

6. The computing device of claim 5, wherein the non-random value includes two or more timestamps inflated into a 256-bit number, and wherein, to authenticate the communications with the electronic source, the electronic processor is further configured to extract the two or more timestamps from the 256-bit number, compare the two or more timestamps to each other, determine whether the two or more timestamps are within a predetermined temporal threshold, and authenticate the communications with the electronic source in response to the two or more timestamps being within the predetermined temporal threshold.

7. The computing device of claim 1, wherein the electronic source is one of a second computing device or a server.

8. A system comprising:

an electronic source configured to output a first random value; and a server including a memory that stores a non-interactive zero knowledge proof authentication program and a plurality of unique passwords; and an electronic processor communicatively connected to the memory, the electronic processor configured to receive the first random value from the electronic source, generate a second random value by performing an exclusive disjunction operation on the first random value with a first password of the plurality of unique passwords, perform an extraction operation on the second random value, determine whether the extraction operation performed on the second random value extracted a non-random value from the second random value, and responsive to determining that the extraction operation performed on the second random value extracted the non-random value from the second random value, authenticate communications with the electronic source,
wherein responsive to determining that the extraction operation performed on the second random value did not extract the non-random value from the second random value, the electronic processor is further configured to
generate a third random value by performing a second exclusive disjunction operation on the first random value with a second password of the plurality of unique passwords,
perform an extraction operation on the third random value,
determine whether the extraction operation performed on the third random value extracted the non-random value from the second random value, and
responsive to determining that the extraction operation performed on the third random value extracted the non-random value from the second random value, authenticate the communications with the electronic source.

9. A system comprising:
an electronic source configured to output a first random value; and
a server including
a memory that stores a non-interactive zero knowledge proof authentication program and a plurality of unique passwords; and
an electronic processor communicatively connected to the memory, the electronic processor configured to
receive the first random value from the electronic source,
generate a second random value by performing an exclusive disjunction operation on the first random value with a first password of the plurality of unique passwords,
perform an extraction operation on the second random value,
determine whether the extraction operation performed on the second random value extracted a non-random value from the second random value, and
responsive to determining that the extraction operation performed on the second random value extracted the non-random value from the second random value, authenticate communications with the electronic source,
wherein the electronic processor is further configured to
generate a third random value by performing an insertion operation of a second non-random value into a fourth random value,
generate a fifth random value by performing a second exclusive disjunction operation on the fourth random value with a second password, and
control a communication interface to transmit the fourth random value and the fifth random value.

10. A system comprising:
an electronic source configured to output a first random value; and
a server including
a memory that stores a non-interactive zero knowledge proof authentication program and a plurality of unique passwords; and
an electronic processor communicatively connected to the memory, the electronic processor configured to
receive the first random value from the electronic source,
generate a second random value by performing an exclusive disjunction operation on the first random value with a first password of the plurality of unique passwords,
perform an extraction operation on the second random value,
determine whether the extraction operation performed on the second random value extracted a non-random value from the second random value, and
responsive to determining that the extraction operation performed on the second random value extracted the non-random value from the second random value, authenticate communications with the electronic,
wherein the non-random value includes a timestamp inflated into a 256-bit number, and wherein, to authenticate the communications with the electronic source based on the electronic source having the first password, the electronic processor is further configured to
extract the timestamp from the 256-bit number,
determine whether the timestamp is within a predetermined temporal threshold, and
authenticate the communications with the electronic source in response to the timestamp being within the predetermined temporal threshold.

11. A system comprising:
an electronic source configured to output a first random value; and
a server including
a memory that stores a non-interactive zero knowledge proof authentication program and a plurality of unique passwords; and
an electronic processor communicatively connected to the memory, the electronic processor configured to
receive the first random value from the electronic source,
generate a second random value by performing an exclusive disjunction operation on the first random value with a first password of the plurality of unique passwords,
perform an extraction operation on the second random value,
determine whether the extraction operation performed on the second random value extracted a non-random value from the second random value, and
responsive to determining that the extraction operation performed on the second random value extracted the non-random value from the second random value, authenticate communications with the electronic source,
wherein the electronic processor is further configured to determine a 256×5 cryptographic hash from the first password, wherein the first random value is a first set of three random numbers r1', r2", and r3", and
wherein, to generate the second random value by performing the exclusive disjunction operation on the first random value with the first password of the plurality of unique passwords, the electronic processor is further configured to perform the exclusive disjunction operation on the first set of three random numbers r1', r2", and r3" with the 256×5 cryptographic hash to determine a second set of three random numbers r1, r2', and r3', the second set of three random numbers r1, r2', and r3' is the second random value.

12. The system of claim 11, wherein, to perform the extraction operation on the second random value, the electronic processor is further configured to
perform a second exclusive disjunction on a portion of the 256×5 cryptographic hash with the random number r1 to determine a third set of random numbers r2 and r3, and
subtract random numbers r1, r2, and r3 from the second set of three random numbers r1, r2', and r3' to extract the non-random value.

13. The system of claim 12, wherein the non-random value includes two or more timestamps inflated into a 256-bit number, and wherein, to authenticate the communications with the electronic source based on the electronic source having the first password, the electronic processor is further configured to
extract the two or more timestamps from the 256-bit number,
compare the two or more timestamps to each other,
determine whether the two or more timestamps are within a predetermined temporal threshold, and
authenticate the communications with the electronic source in response to the two or more timestamps being within the predetermined temporal threshold.

14. The system of claim 8, wherein the electronic source is one of a computing device or a second server.

15. A method comprising:
receiving, with an electronic processor, a first random value from an electronic source;
generating, with the electronic processor, a second random value by performing an exclusive disjunction operation on the first random value with a first password from a plurality of unique passwords;
performing, with the electronic processor, an extraction operation on the second random value;
determining, with the electronic processor, whether the extraction operation performed on the second random value extracted a non-random value from the second random value;
authenticating, with the electronic processor, communications with the electronic source in response to determining that the extraction operation performed on the second random value extracted the non-random value from the second random value;
generating, with the electronic processor, a third random value by performing a second exclusive disjunction operation on the first random value with a second password of the plurality of unique passwords in response to determining that the extraction operation performed on the second random value did not extract the non-random value from the second random value;
performing, with the electronic processor, an extraction operation on the third random value;
determining, with the electronic processor, whether the extraction operation performed on the third random value extracted the non-random value from the third random value; and
authenticating, with the electronic processor, the communications with the electronic source in response to determining that the extraction operation performed on the third random value extracted the non-random value from the third random value.

16. A non-transitory computer-readable medium comprising instructions that, when executed by an electronic processor, cause the electronic processor to perform a set of operations comprising:
generating a second random value by performing an exclusive disjunction operation on a first random value with a first password from a plurality of unique passwords, the first random value being received from an electronic source;
performing an extraction operation on the second random value;
determining whether the extraction operation performed on the second random value extracted a non-random value from the second random value;
authenticating communications with the electronic source in response to determining that the extraction operation performed on the second random value extracted the non-random value from the second random value;
generating a third random value by performing a second exclusive disjunction operation on the first random value with a second password of the plurality of unique passwords in response to determining that the extraction operation performed on the second random value did not extract the non-random value from the second random value;
performing an extraction operation on the third random value;
determining whether the extraction operation performed on the third random value extracted the non-random value from the third random value; and
authenticating the communications with the electronic source in response to determining that the extraction operation performed on the third random value extracted the non-random value from the third random value.

17. The computing device of claim 2, wherein the electronic source is one of a second computing device or a server.

18. The computing device of claim 3, wherein the electronic source is one of a second computing device or a server.

19. The computing device of claim 4, wherein the electronic source is one of a second computing device or a server.

20. The system of claim 10, wherein the electronic source is one of a computing device or a second server.

* * * * *